(12) United States Patent
Conger

(10) Patent No.: US 12,503,043 B2
(45) Date of Patent: Dec. 23, 2025

(54) VEHICLE COMMUNICATION SYSTEM USING PROJECTED LIGHT

(71) Applicant: Magna Electronics Inc., Auburn Hills, MI (US)

(72) Inventor: Jonathan D. Conger, Berkley, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 622 days.

(21) Appl. No.: 16/185,080

(22) Filed: Nov. 9, 2018

(65) Prior Publication Data

US 2019/0135169 A1  May 9, 2019

Related U.S. Application Data

(60) Provisional application No. 62/583,743, filed on Nov. 9, 2017.

(51) Int. Cl.
*B60Q 1/50* (2006.01)
*B60Q 1/48* (2006.01)
*G05D 1/00* (2024.01)
*G05D 1/02* (2020.01)

(52) U.S. Cl.
CPC ............ *B60Q 1/525* (2013.01); *B60Q 1/488* (2013.01); *B60Q 1/507* (2022.05); *G05D 1/0055* (2013.01); *G05D 1/0088* (2013.01); *G05D 1/0257* (2013.01); *B60Q 2400/50* (2013.01)

(58) Field of Classification Search
CPC .......... B60Q 1/50; B60Q 1/488; B60Q 1/525; B60Q 2400/50; G05D 1/0088; G05D 1/0257; G05D 1/0055; G05D 2201/0213
See application file for complete search history.

(56) References Cited

U.S. PATENT DOCUMENTS

| 5,550,677 | A | 8/1996 | Schofield et al. |
| 5,670,935 | A | 9/1997 | Schofield et al. |
| 5,949,331 | A | 9/1999 | Schofield et al. |
| 8,874,317 | B2 | 10/2014 | Marczok et al. |
| 9,487,142 | B2 | 11/2016 | Sobecki et al. |
| 10,134,280 | B1 * | 11/2018 | You ........................ B60Q 1/525 |
| 2003/0147247 | A1 * | 8/2003 | Koike ...................... B60Q 1/50 362/464 |

(Continued)

FOREIGN PATENT DOCUMENTS

CN        110400274 A  * 11/2019

*Primary Examiner* — Nga X Nguyen
(74) *Attorney, Agent, or Firm* — HONIGMAN LLP

(57) ABSTRACT

A driving assist system for a vehicle includes a plurality of sensors having respective fields of sensing exterior of the vehicle. A control includes a data processor that processes data captured by the sensors. The control, via processing of captured data, determines a path of travel for the vehicle. The control, via processing of captured data, determines presence of a pedestrian at or near or approaching the determined path of travel for the vehicle. A projection device is disposed at the vehicle and is operable to project light exterior of the vehicle. The projection device (i) projects light onto the ground that is indicative of the determined path of travel of the vehicle for viewing by the determined pedestrian and/or (ii) projects an alert icon onto the ground to alert the determined pedestrian that the determined pedestrian is at or near or approaching the determined path of travel of the vehicle.

20 Claims, 4 Drawing Sheets

(56) References Cited

U.S. PATENT DOCUMENTS

| | | | |
|---|---|---|---|
| 2014/0218529 A1 | 8/2014 | Mahmoud et al. | |
| 2015/0228195 A1* | 8/2015 | Beaurepaire | B60Q 1/50 340/907 |
| 2015/0344028 A1 | 12/2015 | Gieseke et al. | |
| 2017/0015312 A1 | 1/2017 | Latotzki | |
| 2017/0017847 A1 | 1/2017 | Nakaya | |
| 2017/0050672 A1 | 2/2017 | Gieseke et al. | |
| 2017/0253177 A1* | 9/2017 | Kawamata | B60Q 9/008 |
| 2017/0253237 A1 | 9/2017 | Diessner | |
| 2017/0317748 A1 | 11/2017 | Krapf | |
| 2017/0329346 A1 | 11/2017 | Latotzki | |
| 2018/0029641 A1* | 2/2018 | Solar | G06T 7/90 |
| 2018/0173237 A1* | 6/2018 | Reiley | B60Q 1/525 |
| 2018/0174460 A1* | 6/2018 | Jung | B60Q 1/525 |
| 2018/0326982 A1* | 11/2018 | Paris | G08G 1/166 |
| 2019/0073904 A1* | 3/2019 | Heinla | G05D 1/0088 |
| 2020/0156545 A1 | 5/2020 | Sobecki et al. | |

\* cited by examiner

VEHICLE COMMUNICATION SYSTEM USING PROJECTED LIGHT

CROSS REFERENCE TO RELATED APPLICATION

The present application claims the filing benefits of U.S. provisional application Ser. No. 62/583,743, filed Nov. 9, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driving assistance system or vision system that, responsive to detection of an object or pedestrian or parking space, projects (using projection mapping technology) onto the ground or detected object to highlight the object and/or project a planned path of travel of the vehicle. The projection of the path or object is viewable by pedestrians or other drivers/passengers of other vehicles to inform the pedestrians or other drivers/passengers of the intent of the subject or equipped vehicle. The projection of the path or object is also viewable by the drivers/passengers of the subject or equipped vehicle to inform them of the planned control of the subject vehicle (such as an evasive maneuver or the like).

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
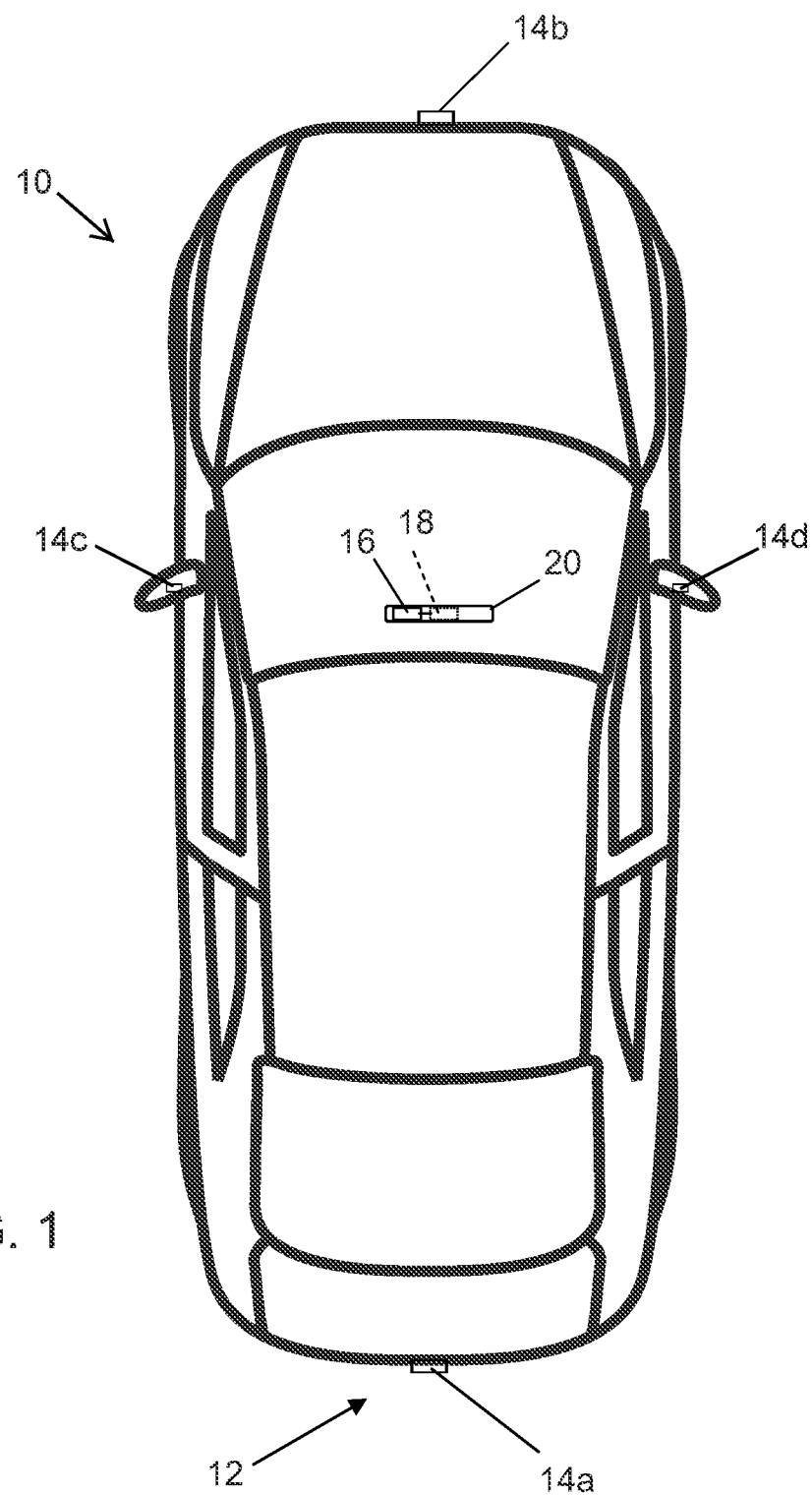
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Driver-to-Driver communication through hand waves, head nods, eye contact, etc. is critical for navigating congested traffic situations, parking, or even the simple four-way stop. The future world solves this problem with Vehicle-to-Vehicle (V2V) communication technology, but in the meantime a uniform method for Vehicle-to-Human (V2H) communication is desired; not only to surrounding drivers and pedestrians, but also to the passengers and "driver" inside the autonomous vehicle, who will need constant information on the vehicle control system's intentions to feel at ease in these ambiguous situations. Some automakers have proposed sounds, flashing lights, and other cryptic methods that require interpretation.

The present invention utilizes projection mapping technology, which can project images onto non-orthogonal surfaces (such as, for example, the ground, walls, complex surfaces, and/or the like) to visually show the vehicle passenger and/or surrounding drivers/pedestrians the intentions of the control system of the subject vehicle (such as an autonomously controlled vehicle). Projection mapping or video mapping and spatial augmented reality, is a projection technology used to turn objects, often irregularly shaped, into a display surface for video projection. By using software, a two-dimensional or three-dimensional object is spatially mapped on the virtual program, which mimics the real environment it is to be projected on. The software can interact with a projector to fit any desired image onto the surface of that object.

Figure 2:
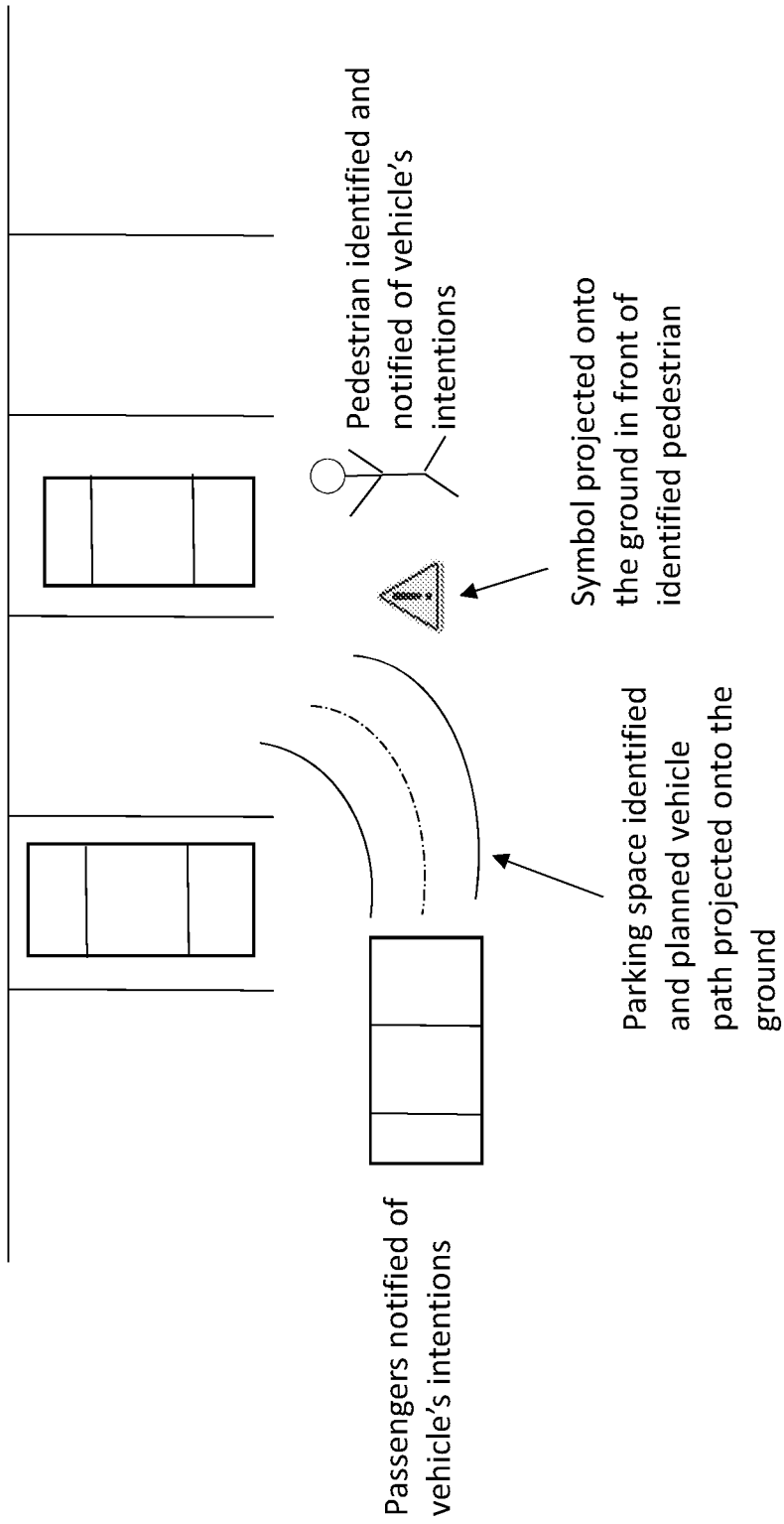
FIG. 2 is a plan view of a vehicle equipped with the projection system of the present invention, showing projection of a planned path of travel of the vehicle toward a detected parking space, and showing a projected symbol for a pedestrian to see.

The projecting mapping and projecting system of the present invention is particularly useful in parking lot situations (see FIG. 2), where the vehicle system can identify a parking space and then visually project its planned path (such as via one or more lines projected onto the ground along the determined path of travel of the vehicle) to enter the parking space. The projected path may also inform or alert pedestrians to stay away from the path (and may include a symbol or icon projected onto the ground in front of a detected pedestrian). The system may also provide notice to the in-vehicle passengers to assure them that the autonomous vehicle is not going to miss the space and crash into a parked car.

Other potential situations may including projecting a hazard symbol on the ground as the vehicle is attempting to come to a safe stop, projecting arrows or stop signs to communicate to other vehicles that the subject vehicle is about to change trajectory, or projecting detailed path information in the event of an obstacle in the road. The system of the subject vehicle can inform the in-vehicle passengers that the obstacle has been identified by highlighting it (see FIG. 3), and the avoidance path can be mapped onto the ground as the car executes it. This would be particularly useful in nighttime driving situations or conditions.

Figure 3:
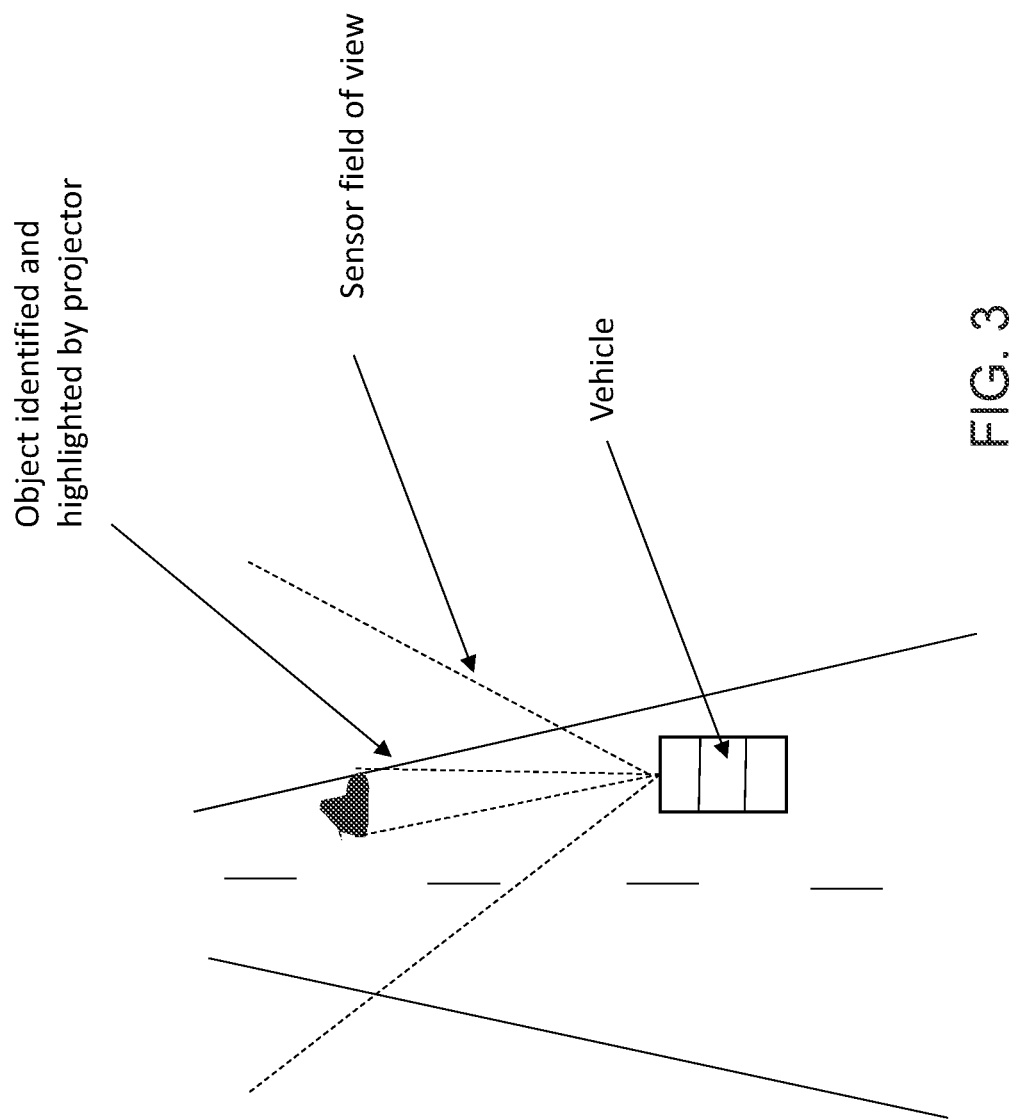
FIG. 3 is a view of a vehicle equipped with the projection system of the present invention, showing projection highlighting of an object detected ahead of the vehicle.

As shown in FIG. 3, an object ahead of the vehicle may be detected and highlighted by the projector. The object may comprise a pedestrian, other vehicle, rock, animal, black ice, or any object or element that may be of interest to the vehicle control system. The object is highlighted by the projector and the in-vehicle passengers are informed that an evasive maneuver is about to occur. The object is continuously identified so the intention of the subject vehicle is clear. The planned path of the subject vehicle may also be projected onto the road. Optionally, the distance to the object or the time to the evasive maneuver could also be projected.

Projecting mapping has the ability to map complex images onto objects with substantial surface variations. Programmers use 3D laser scanning technology to map the surface, and then algorithms create the projection to give the appearance that the object is a flat display board. To achieve this live in an automotive application, the system may utilize integrated LIDAR, RADAR, stereo cameras, or ultrasonic sensors already employed on the vehicle, with all of the sensors working in real time to measure and detect objects, and present their surface profile information to the projector control unit to generate the mapped projection in real-time. Cameras may be used as ambient light sensors to dial in an appropriate projector intensity. The projector may utilize any suitable light technology. The projectors may mounted on the front, rear, sides, top, or underside of the vehicle as needed or desired.

Figure 4:
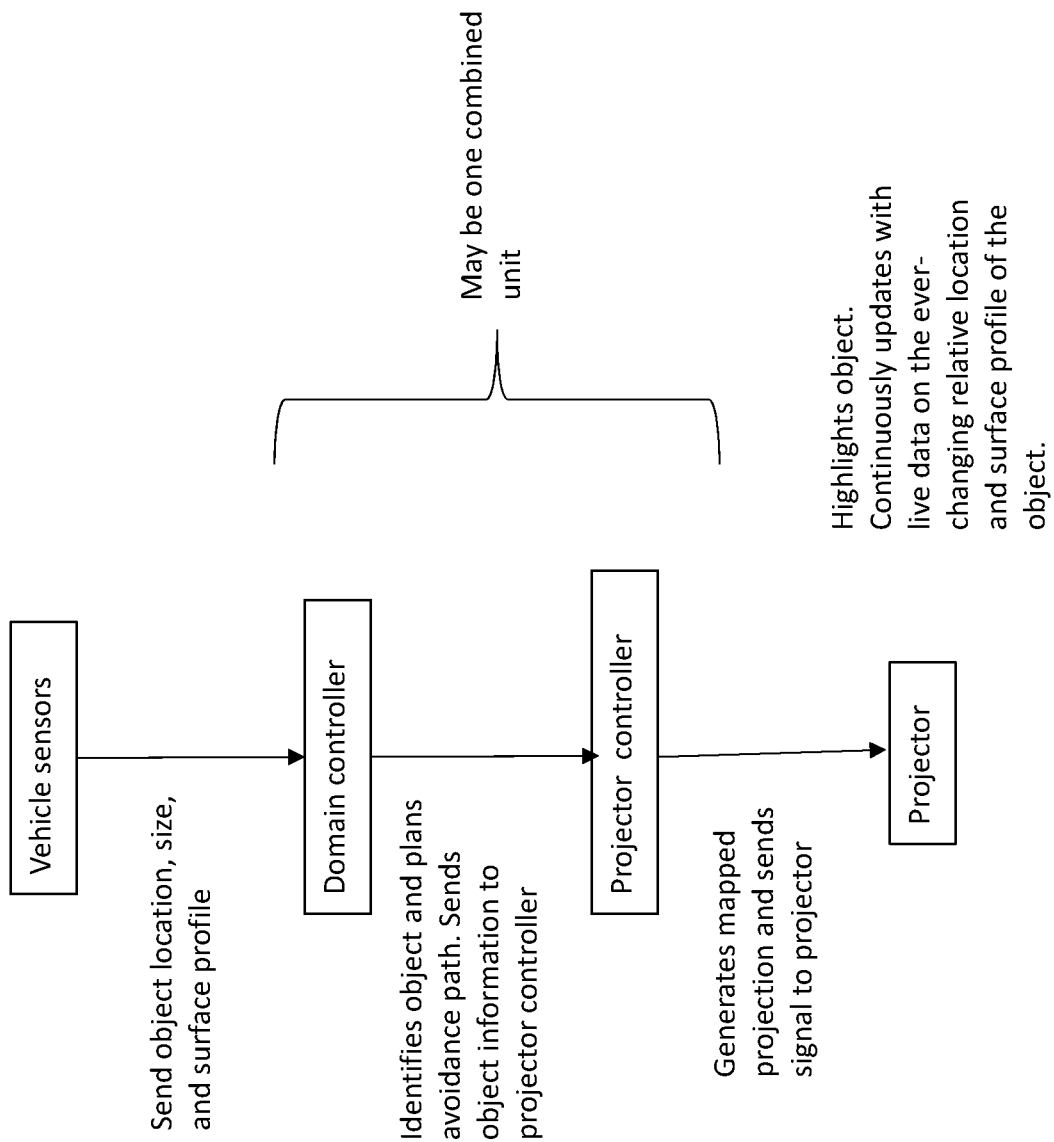
FIG. 4 is a block diagram showing the sensing and projecting system of the present invention.

The system of the present invention thus utilizes a plurality of vehicle sensors (see FIG. 4) that capture or sense data and communicate data or information pertaining to a detected object, object location, object size and surface profile. A domain controller receives the data or information output by the vehicle sensors and identifies objects and plans avoidance path(s) for the subject vehicle to follow in order to avoid a collision. The domain controller communicates the object information and path to the projector controller (optionally, the domain controller and the projector controller may be a single controller or unit that performs both functions).

The projector controller, responsive to the communications from the domain controller, generates the projection profiles or mapped projections and communicates the projection(s) to the projector. The projector then projects the determined and communicated projection. For example, the projector may highlight the object or project the path or project an icon or alert or symbol. The projector may continuously or episodically update the projection based on real time data and changing relative location and surface profile of the object that is being highlighted or projected onto.

The system thus may utilize various sensors to detect objects and/or pedestrians and/or parking spaces ahead of the vehicle, and may generate projections onto the ground or detected object to inform the in-vehicle passengers and/or pedestrians or passengers and drivers of other vehicles of the detected object and/or determined path of travel of the subject vehicle. The system may operate in conjunction with a vision system and/or non-vision sensing system (such as radar, lidar, ultrasonic sensors and/or the like).

Thus, for example, if the vehicle is being autonomously controlled or maneuvered, such as into a parking space or the like, the system may project an arrow or curved line or the like onto the ground to show the planned path of travel of the vehicle. A pedestrian that may be at or approaching the vehicle can readily see and determine the path of travel of the vehicle and can avoid getting in the vehicle's path. The system thus provides a further safety feature to assist in avoiding pedestrians by informing the pedestrians of the planned path of the vehicle.

The system may utilize aspects of the systems described in U.S. Publication Nos. US-2018-0029641; US-2017-0317748 and/or US-2014-0218529, which are hereby incorporated herein by reference in their entireties. The system may utilize aspects of the parking assist systems described in U.S. Pat. No. 8,874,317 and/or U.S. Publication Nos. US-2017-0329346; US-2017-0253237; US-2017-0050672; US-2017-0017847; US-2017-0015312 and/or US-2015-0344028, which are hereby incorporated herein by reference in their entireties For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

For example, the vision system and/or processing and/or camera and/or circuitry may utilize aspects described in U.S. Pat. Nos. 9,233,641; 9,146,898; 9,174,574; 9,090,234;

9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication Nos. US-2017-0276788; US-2017-0254873; US-2017-0222311 and/or US-2010-0245066, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A driving assist system for a vehicle, said driving assist system comprising:

a plurality of sensors disposed at a vehicle and having respective fields of sensing exterior of the vehicle;

a control comprising a data processor that processes data captured by said plurality of sensors;

a projection device disposed at the vehicle and operable to project light exterior of the vehicle;

wherein said control, via processing at said control of captured data, determines a current path of travel for the vehicle;

wherein said control, via processing at said control of captured data, determines presence of a pedestrian at or near or approaching the determined current path of travel for the vehicle and determines a current location of the determined pedestrian relative to the vehicle;

wherein, responsive to determination of the pedestrian and determination of the current location of the determined pedestrian relative to the vehicle, said projection device projects an alert icon onto the ground at or near the determined current location of the determined pedestrian to alert the determined pedestrian that the determined pedestrian is at or near or approaching the determined current path of travel of the vehicle;

wherein, said control, via processing at said control of captured data, determines movement of the determined pedestrian relative to the vehicle and determines an updated location of the determined pedestrian as the pedestrian moves relative to the vehicle, and wherein, based at least in part on the movement of the determined pedestrian, said projection device adjusts projection of the alert icon to project the alert icon onto the ground at or near the determined updated location of the determined pedestrian;

wherein said control, via processing at said control of captured data, determines surface variations of a surface profile of the ground at or near the determined pedestrian; and wherein said control adjusts said projection device to adjust display of the projected light of the alert icon on the ground at or near the determined pedestrian based in part on the determined surface variations of the surface profile of the ground at or near the determined pedestrian.

2. The driving assistance system of claim 1, wherein said projection device projects light onto the ground that is indicative of the determined current path of travel of the vehicle for viewing by the determined pedestrian.

3. The driving assistance system of claim 2, wherein the projected light comprises an arrow or curved line to show the determined current path of travel of the vehicle from the current location of the vehicle to a determined destination.

4. The driving assistance system of claim 1, wherein said projection device projects the alert icon onto the ground to alert the determined pedestrian that the determined pedestrian is approaching the determined current path of travel of the vehicle.

5. The driving assistance system of claim 1, wherein said control, via processing of captured data, detects presence of an object at or in the determined current path of travel of the vehicle.

6. The driving assistance system of claim 5, wherein, responsive to detection of an object at or in the determined current path of travel of the vehicle, said projection device projects light onto the detected object to highlight the detected object.

7. The driving assistance system of claim 5, wherein said control, responsive to detection of the object at or in the determined current path of travel of the vehicle, adjusts the path of travel of the vehicle to avoid the object.

8. The driving assistance system of claim 7, wherein said projection device projects light onto the ground that is indicative of the adjusted path of travel.

9. The driving assistance system of claim 1, wherein the determined current path of travel is a path from the current location of the vehicle into a parking space.

10. The driving assistance system of claim 1, wherein said projection device projects the alert icon using projection mapping technology.

11. The driving assistance system of claim 1, wherein said plurality of sensors comprise a plurality of cameras disposed at the vehicle and having respective fields of view exterior of the vehicle.

12. The driving assistance system of claim 1, wherein said plurality of sensors comprise a plurality of radar sensors disposed at the vehicle and having respective fields of sensing exterior of the vehicle.

13. A driving assist system for a vehicle, said driving assist system comprising:

a plurality of sensors disposed at a vehicle and having respective fields of sensing exterior of the vehicle;

wherein said plurality of sensors comprise a plurality of cameras disposed at the vehicle and having respective fields of view exterior of the vehicle;

wherein said plurality of sensors comprise a plurality of radar sensors disposed at the vehicle and having respective fields of sensing exterior of the vehicle;

a control comprising a data processor that processes data captured by said plurality of sensors;

a projection device disposed at the vehicle and operable to project light exterior of the vehicle;

wherein said control, via processing at said control of captured data, determines a current path of travel for the vehicle;

wherein said control, via processing at said control of captured data, determines presence of a pedestrian at or near or approaching the determined current path of travel for the vehicle and determines a current location of the determined pedestrian relative to the vehicle;

wherein, responsive to determination of the pedestrian and determination of the current location of the determined pedestrian relative to the vehicle, said projection device (i) projects light onto the ground that is indicative of the determined current path of travel of the vehicle for viewing by the determined pedestrian and (ii) projects an alert icon onto the ground at or near the determined current location of the determined pedestrian to alert the determined pedestrian that the determined pedestrian is at or near or approaching the determined current path of travel of the vehicle;

wherein, said control, via processing at said control of captured data, determines movement of the determined pedestrian relative to the vehicle and determines an updated location of the determined pedestrian as the pedestrian moves relative to the vehicle, and wherein, based at least in part on the movement of the determined pedestrian, said projection device adjusts projection of the alert icon to project the alert icon onto the ground at or near the determined updated location of the determined pedestrian;

wherein said control, via processing at said control of captured data, determines surface variations of a surface profile of the ground at or near the determined pedestrian; and wherein said control adjusts said projection device to adjust display of the projected light of the alert icon on the ground at or near the determined pedestrian based in part on the determined surface variations of the surface profile of the ground at or near the determined pedestrian.

14. The driving assistance system of claim 13, wherein the projected light comprises an arrow or curved line to show the determined current path of travel of the vehicle from the current location of the vehicle to a determined destination.

15. The driving assistance system of claim 13, wherein the determined current path of travel is a path from the current location of the vehicle into a parking space.

16. A driving assist system for a vehicle, said driving assist system comprising:

a plurality of sensors disposed at a vehicle and having respective fields of sensing exterior of the vehicle;

wherein said plurality of sensors comprise a plurality of cameras disposed at the vehicle and having respective fields of view exterior of the vehicle;

wherein said plurality of sensors comprise a plurality of radar sensors disposed at the vehicle and having respective fields of sensing exterior of the vehicle;

a control comprising a data processor that processes data captured by said plurality of sensors;

a projection device disposed at the vehicle and operable to project light exterior of the vehicle;

wherein said control, via processing at said control of captured data, determines a current path of travel for the vehicle;

wherein said control, via processing at said control of captured data, determines presence of a pedestrian at or near or approaching the determined current path of travel for the vehicle and determines a current location of the determined pedestrian relative to the vehicle;

wherein said control, via processing of captured data, detects presence of an object at or in the determined current path of travel of the vehicle;

wherein said control, responsive to detection of the object at or in the determined current path of travel of the vehicle, adjusts the determined path of travel of the vehicle to avoid the object;

wherein, responsive to determination of the pedestrian and determination of the current location of the determined pedestrian relative to the vehicle, said projection device projects light onto the ground that is indicative of the adjusted determined path of travel of the vehicle for viewing by the determined pedestrian;

wherein, responsive to determination of the pedestrian and determination of the current location of the determined pedestrian relative to the vehicle, said projection device projects an alert icon onto the ground at or near the determined current location of the determined pedestrian to alert the determined pedestrian that the determined pedestrian is at or near or approaching the adjusted determined path of travel of the vehicle;

wherein, said control, via processing at said control of captured data, determines movement of the determined pedestrian relative to the vehicle and determines an updated location of the determined pedestrian as the pedestrian moves relative to the vehicle, and wherein, based at least in part on the movement of the determined pedestrian, said projection device adjusts projection of the alert icon to project the alert icon onto the ground at or near the determined updated location of the determined pedestrian;

wherein said control, via processing at said control of captured data, determines surface variations of a surface profile of the ground at or near the determined pedestrian; and wherein said control adjusts said projection device to adjust display of the projected light of the alert icon on the ground at or near the determined pedestrian based in part on the determined surface variations of the surface profile of the ground at or near the determined pedestrian.

17. The driving assistance system of claim 16, wherein the projected light comprises an arrow or curved line to show the adjusted determined path of travel of the vehicle from the current location of the vehicle to a determined destination.

18. The driving assistance system of claim 16, wherein said projection device projects the alert icon onto the ground to alert the determined pedestrian that the determined pedestrian is approaching the adjusted determined path of travel of the vehicle.

19. The driving assistance system of claim 16, wherein, responsive to detection of an object at or in the adjusted determined path of travel of the vehicle, said projection device projects light onto the detected object to highlight the detected object.

20. The driving assistance system of claim 16, wherein the determined current path of travel is a path from the current location of the vehicle into a parking space.

* * * * *